United States Patent
Goeting et al.

(10) Patent No.: US 9,308,500 B2
(45) Date of Patent: Apr. 12, 2016

(54) MEMBRANE STACK FOR A MEMBRANE BASED PROCESS AND METHOD FOR PRODUCING A MEMBRANE THEREFOR

(75) Inventors: Christiaan Haldir Goeting, Amsterdam (NL); Jan Valk, Cornjum (NL)

(73) Assignee: Redstack B.V., Sneek (NL)

( * ) Notice: Subject to any disclaimer, the term of this patent is extended or adjusted under 35 U.S.C. 154(b) by 654 days.

(21) Appl. No.: 13/638,212

(22) PCT Filed: Mar. 24, 2011

(86) PCT No.: PCT/NL2011/050204
§ 371 (c)(1),
(2), (4) Date: Sep. 28, 2012

(87) PCT Pub. No.: WO2011/126363
PCT Pub. Date: Oct. 13, 2011

(65) Prior Publication Data
US 2013/0017416 A1 Jan. 17, 2013

(30) Foreign Application Priority Data
Apr. 6, 2010 (NL) .................................. 2004510

(51) Int. Cl.
*H01M 8/00* (2006.01)
*B01D 63/08* (2006.01)
*B01D 61/50* (2006.01)
*B01D 69/06* (2006.01)
*B26F 1/38* (2006.01)
*H01M 8/22* (2006.01)
*H01M 4/88* (2006.01)
*H01M 8/02* (2006.01)
*H01M 8/10* (2006.01)
*H01M 8/16* (2006.01)
*H01M 8/20* (2006.01)

(52) U.S. Cl.
CPC .............. *B01D 63/082* (2013.01); *B01D 61/50* (2013.01); *B01D 69/06* (2013.01); *B26F 1/38* (2013.01); *H01M 8/026* (2013.01); *H01M 8/227* (2013.01); *B01D 2313/14* (2013.01); *B01D 2325/06* (2013.01); *H01M 4/8875* (2013.01); *H01M 8/0247* (2013.01); *H01M 8/0291* (2013.01); *H01M 8/1004* (2013.01); *H01M 8/16* (2013.01); *H01M 8/20* (2013.01); *Y02E 60/50* (2013.01); *Y10T 156/1082* (2015.01)

(58) Field of Classification Search
CPC ....... B01D 61/50; B01D 63/082; B01D 69/06
See application file for complete search history.

(56) References Cited

U.S. PATENT DOCUMENTS

| 4,319,978 | A | 3/1982 | Millman |
| 8,932,448 | B2 * | 1/2015 | Valk et al. ..................... 204/634 |
| 2006/0016685 | A1 | 1/2006 | Hawkins et al. |

FOREIGN PATENT DOCUMENTS

| EP | 0259109 A2 | 3/1988 |
| GB | 1289738 A | 9/1972 |
| SU | 874090 A1 | 10/1981 |
| WO | WO 2005/009596 A1 | 2/2005 |

*Primary Examiner* — Arun S Phasge
(74) *Attorney, Agent, or Firm* — Bret E. Field; Bozicevic, Field & Francis LLP

(57) ABSTRACT

The present invention relates to a membrane stack and device for a membrane based process and method therefore. The membrane stack comprises: a number of membranes (78) forming compartments; and fluid supply and discharge means (80) for supplying and discharging a fluid to the compartments such that the fluid is supplied and discharged substantially in the plane of the membrane of the membrane stack. Preferably, the fluid supply and discharge means are provided on opposite sides of the membrane stack. Further, the invention relates to a method of forming the membranes (78).

17 Claims, 4 Drawing Sheets

Figure 1:
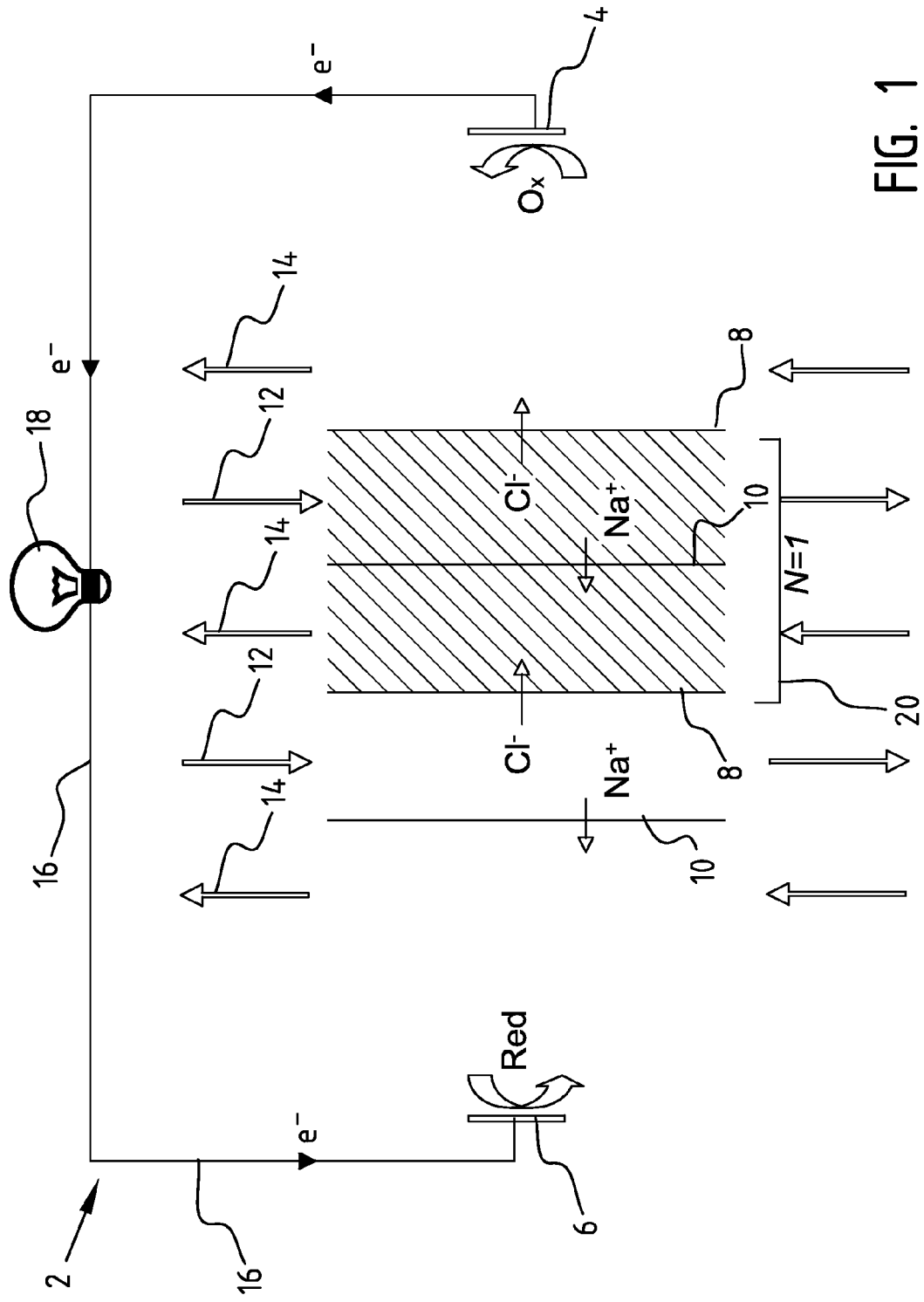

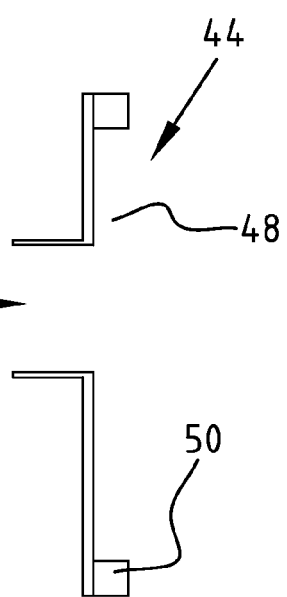
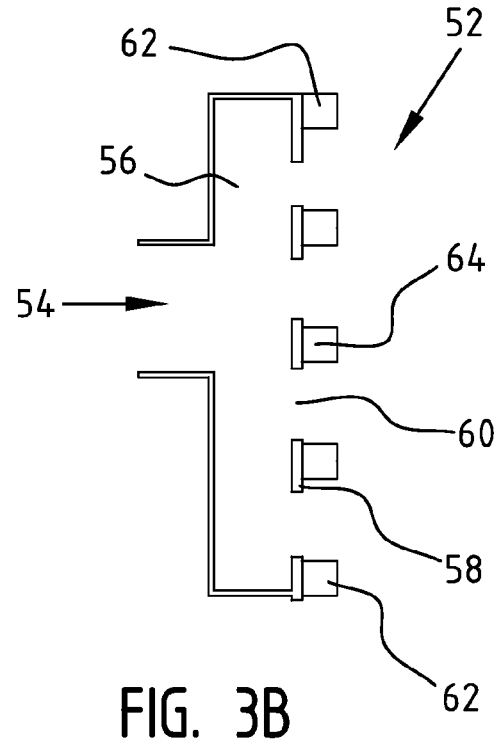
FIG. 3A
FIG. 3B
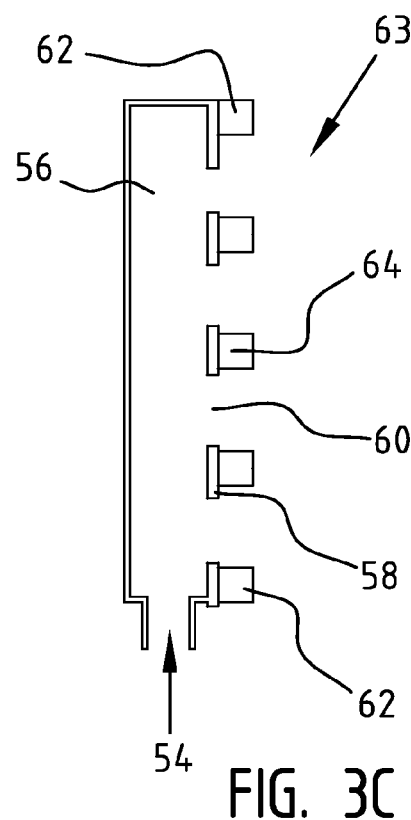
FIG. 3C

MEMBRANE STACK FOR A MEMBRANE BASED PROCESS AND METHOD FOR PRODUCING A MEMBRANE THEREFOR

The present invention relates to a membrane stack for a membrane based process. Membrane based processes include electrodialysis (ED), reverse electrodialysis (RED) and other membrane processes, such as fuel cells, including bio and microbial fuel cells, and redox flow batteries.

Known membrane based processes like electrodialysis and reverse electrodialysis use a membrane stack comprising a number of cation and anion exchange membranes that are alternately placed. In case of an electrodialysis process a voltage is applied between an anode and a cathode on different sides of the membrane stack. Positive ions tend to move toward a cathode and negative ions tend to move to an anode, such that alternately concentrated and diluted electrolyte solutions are the result. In a reverse electrodialysis process the above process is reversed in order to generate electric energy. A device for performing such an electrodialysis process is described in NL 1031148. In membrane based processes, like ED and RED, electrolyte solutions flow through electrolyte compartments formed between adjacent membranes of the membrane stack. In existing membrane stacks this flow is subjected to high hydraulic resistances together with a large ineffective area, due to the presence of spacers, turbulence promoters and/or guiding devices etc., in the membrane stack not contributing to the process efficiency.

The present invention has for its object to provide a membrane stack for membrane based processes, wherein these processes can be operated more efficiently.

This object is achieved with the membrane stack according to the invention for use in a membrane based process, the membrane stack comprising:
  a number of membranes forming compartments; and
  fluid supply and discharge means for supplying and discharging a fluid to the compartments such that the fluid is supplied and discharged substantially in the plane of the membrane of the membrane stack.

It will be understood that the phraseology or terminology employed herein is for the purpose of description and not of limitation. Thus, the expression "membrane" is intended to define and cover cation exchange membrane (CEM), anion exchange membrane (AEM), and porous substrate.

The membrane stack according to the invention can be used to perform an electrodialysis process. Such process can be used for, among other purposes, the production of drinking water from saltwater or brackish water. In this process the stack of membranes is placed between an anode and cathode. If a supply flow with saltwater or brackish water is pumped through the compartments formed between the anion and cation exchange membrane, no controlled displacement of ions between the compartments takes place as long as no voltage is applied between the anode and cathode. If however a voltage is applied between the anode and cathode, the positive ions then tend to move toward the cathode, while the negative ions will tend to move toward the anode. In principle, the negative ions cannot however pass through the cation exchange membranes (CEM) and the positive ions cannot pass through the anion exchange membranes (AEM). The skilled person will understand that passing of negative ions and positive ions through a CEM or AEM respectively is in fact discouraged by the use of selective membrane material. A 100% selectivity is practically not possible with the commercially available membranes. The result hereof is that the initially identical supply flows change into alternately concentrated and diluted electrolyte solutions.

As already mentioned the above described electrodialysis process can be reversed in order to generate electric energy. Also in such process a membrane stack according to the invention can be used. In reverse electrodialysis, or "Blue Energy", the stack of membranes is also placed between an anode and cathode. However, the compartments formed between the anion and cation exchange membrane are now filled or charged with alternate concentrated and diluted electrolyte solutions, such as saltwater and freshwater. A unit of an anion exchange membrane and a cation exchange membrane, one of which separates a concentrated and a diluted electrolyte solution and the other of which shields one of the electrolyte solutions on the other side, is referred to as a dialytic cell.

As a result of the differences in concentration between the concentrated and diluted electrolyte solutions, ions will tend to move from high to low concentrations in order to equalize the concentrations. In principle, anions cannot however pass through the cation exchange membranes and are only allowed through the anion exchange membranes. In principle, cations can only pass through the cation exchange membranes. As mentioned before, the skilled person will understand that passing of negative ions and positive ions through a CEM or AEM respectively is in fact discouraged by the use of selective membrane material. A 100% selectivity is practically not possible with the commercially available membranes.

Due to this limitation in the freedom of movement of cations and anions, a net transport of cations and anions will take place in opposite directions. A prerequisite for this ion transport in opposite directions is that the electric neutrality of the solutions is maintained. This takes place in the dialytic cell because, at the moment a cation enters or exits, an anion exits or enters. In the outer parts or compartments however, where the electrodes are placed, this is not possible. In these electrode compartments the electric neutrality is maintained by oxidation and reduction reactions, for example, oxidative dissociation of water taking place at the anode and reductive dissociation taking place at the cathode. Acid or base is formed here. It is also possible that electrolytes, such as $Cl^-$, take part in oxidation or reduction reactions. By electrically connecting the anode and cathode electrons can run from the anode to the cathode, thereby creating an electric current.

As an example, the reactions which take place in the anode and cathode compartments can be represented as follows:

Anode reaction(s):

$$H_2O \rightarrow \tfrac{1}{2}O_2 + 2\,H^+ + 2e^- \;(-1.23\,V) \tag{1}$$

$$2\,Cl^- \rightarrow Cl_2(g) + 2e^- \;(-1.36\,V) \tag{2}$$

Cathode reaction:

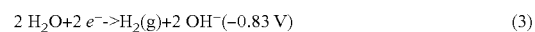
$$2\,H_2O + 2\,e^- \rightarrow H_2(g) + 2\,OH^- \;(-0.83\,V) \tag{3}$$

It will be understood that depending on the redox-couple and/or electrolyte solutions that are used in accordance with the present invention other anode and cathode reactions will be involved.

The fluid supply and discharge means supply and discharge fluid as a liquid or a gas to and from the membrane stack. The electrolyte solutions relate to fluids including both liquids and gases. For a RED-process the fluid involves two electrolyte solutions, for example. In case two fluids are supplied this may involve two liquids, two gases, or one gas and one liquid.

The cathode and anode compartments are not discussed in detail as the configuration of these compartments is known to the skilled person.

When the membrane stack according to the invention is used in a fuel cell the configuration to the stack may involve only one type of membrane, like a CEM, an AEM, or a bipolar membrane, or porous substrate material forming compartments.

In other applications with the membrane stack according to the invention, including electrodialysis (ED) and reverse electrodialysis (RED), a cation exchange membrane and an anion exchange membrane, or a cation exchange membrane and a porous substrate material, are used which are placed alternately thereby forming electrolyte compartments. In a preferred embodiment cation and anion exchange membranes are provided, for example for a RED process. In an alternative embodiment the anion exchange membrane is substituted by a porous substrate, such as a non-woven made from a polyolefin.

Providing supply and discharge means such that a fluid, like an electrolyte solution, is provided from a side of the membrane stack minimizes overall flow resistances over the membrane stack and/or internal leakage. Preferably, providing the fluid from the side of the membrane stack relates to providing the fluid substantially in the plane of the membranes thereto. This minimises the flow resistance as the number of bends is minimised. Also, the membrane surface can be used more efficiently. This both improves the performance of a membrane base process, like an electrodialysis and a reversed electrodialysis process. According to the invention the fluid is supplied and discharged from the sides of the membrane stack. In one embodiment on such side a chamber, room or space is provided for distributing the fluid over de membranes in the membrane stack. This chamber, room or space is part of the fluid supply and discharge means and is provided with an opening for supply or discharge of fluid to or from the chamber, room or space. This supply or discharge opening can be oriented in different directions depending on the space available for the process operation, for example. This opening can be directed towards the stack of membranes or in another configuration parallel to the stack of membranes or perpendicular to the channels therein, for example. It will be understood that a number of configurations for these supply and discharge means are possible.

In conventional membrane stacks the fluid(s), like an electrolyte solution, is provided by manifolds from the top side or the bottom side of the membrane stack. This requires the provision of holes in the membrane for supply of the solutions. To enable a flow along the membranes in the (electrolyte) compartments in the plane of the membranes the manifolds provide the flow to so-called headers for distribution the flow over the membrane. In these conventional configurations the flow follows a relatively tortuous path before entering the (electrolyte) compartments.

By providing the supply and discharge means according to the invention no channels and/or distribution channels, such as so-called headers, are required. This results in the surface of the membranes being used effectively and efficiently with the membrane stack according to the present invention.

An additional advantage of the membrane stack according to the present invention is the reduction of leakages of fluid, like electrolyte solution. This reduction is achieved by providing fluid from the side of the membrane stack such that no separate distribution channels or distribution system, such as so-called headers, is required.

Furthermore, as an additional advantage the fouling of the stack of membranes is significantly reduced by providing the supply and discharge means on the side on the membrane stack. This is achieved as the flow of the fluid is directed or routed more effectively with minimal number of bends and transitions. This reduces the need for cleaning operations, thereby improving the overall efficiency of a membrane based process. A further advantage is the reduction of (electrical) leakage, involving (ionic) short-cut currents, as the resistance at the transition between supply and discharge means and the (electrolyte) compartments is improved.

Preferably, the fluid supply and discharge means for providing one type of fluid, like electrolyte solution, are provided on opposite sides of the membrane stack. This achieves a relatively straight forward flow of this fluid, like electrolyte solution, from the entry on one side of the membrane stack to the exit on the other opposite side of the membrane stack. The supply and discharge means on the first side of the membrane stack provides the fluid to one side of the membranes over preferably all the relevant compartments of the entire stack of membranes. After the fluid flow has passed the stack of membranes, it exits the stack of membranes on the opposite side of the stack of membranes on the exit side of the supply and discharge means. This achieves an efficient configuration for the membrane stack, such that the membrane based processes, like ED and RED, can be performed efficiently.

In a preferred embodiment according to the present invention second fluid supply and discharge means are provided on different sides of the membrane stack to provide a second fluid to chambers or compartments from a different side of the membrane stack. In fact, this provides a second fluid, like an electrolyte solution, with a flow direction substantially perpendicular to the flow direction of the first fluid. Such cross-flow configuration is both effective and efficient.

For example in a RED process with first and second fluid supply and discharge means, compartments are formed between the anion exchange membrane, or substrate material, and a cation exchange membrane that are placed alternately in the stack of membranes. Adjacent compartments are loaded with concentrated and diluted electrolyte solutions, such as salt and fresh water, for example. Due to these concentration differences between the low osmotic electrolyte solution and high osmotic electrolyte solution, ions will be inclined to move from the high osmotic solution to the low osmotic solution in order to level concentrations thereof. This movement is regulated by the membranes in that anions only pass the anion exchange membrane and cations only pass through the cation exchange membrane. By this net transport of cations and anions in opposite directions, the membrane based process is performed. Preferably, in the membrane stack according to the invention, the direction of fluid flows through the compartments is configured such that flows in adjacent compartments have a flow direction that is substantially oriented in a perpendicular direction as compared to the flow direction in the adjacent compartment. In fact, this enables a cross-flow configuration for the membrane stack according to the invention. This enables a configuration wherein first supply and discharge means are provided on opposite sides of the stack of membranes and in combination therewith second supply and discharge means on the other sides of the stack. This achieves an effective distribution of the respective flows over the stack of membranes with minimal flow resistances. This improves the overall efficiency of the membrane based process.

In a preferred embodiment according to the present invention the fluid supply and discharge means comprise a distribution chamber for distributing the fluid over the membranes.

By providing the supply and discharge means with a distribution chamber, no distribution channels in/on the membrane itself are required. This prevents the use of so-called headers for the membranes. This improves the effect of the membranes by increasing the area of the stack that can be used for the process. Furthermore, distribution of the fluid, like electrolyte solution, is improved by providing a distribution chamber in the supply and discharge means. The fluid is distributed evenly over the different compartments between the membranes. In addition, the resistance caused by the distribution of flow over the compartments is minimized. Providing channels may involve the use of so-called spacers.

In a preferred embodiment according to the present invention at least some of the membranes comprise channels enabling a fluid flow.

By providing membranes with a profile constituting appropriate channels for the flow of fluid, like electrolyte solution, a compact membrane stack is achieved. This reduces the overall dimensions of the membrane stack, or increases the performance of the membrane stack for similar dimensions thereof. In addition, providing profiled membranes make the use of so-called spacers between the membranes unnecessary. This achieves a more compact configuration for the membrane stack. Furthermore, this contributes to a reduction of the hydraulic resistance and/or the fouling. Also, a cost saving can be achieved by omitting the spacers.

Preferably, the channels are provided with a width in a range of 0.1-50 mm and more preferably 1-10 mm. The channels are preferably provided with a depth in a range of 10-2000 μm and more preferably 50-200 μm. Experiments and/or calculations indicate that the dimensions mentioned above result in an optimal configuration being a trade-off between flow behaviour and the overall performance of the membrane based process using the membrane stack according to the invention.

In a preferred embodiment according to the invention the membranes are provided with an unprofiled area to reduce, among other things, (ionic) short-cut currents, preferably in the range of 1-100 mm.

By providing a membrane with a part of the surface without profile, i.e. without channels, reduces (ionic) short-cut currents. However, choosing this unprofiled area too large reduces the effective surface area of the membrane. Experiments have shown that the unprofiled area typically is in the range of 5-100 mm. For example, when sea water is used as a fluid with about 30 g/l NaCl and the unprofiled area is about 10 mm, with channels in the other part of the membrane with a depth of 0.2 mm and a width of 1 mm the lateral resistance per channel is about 12500 Ω. The resistance perpendicular to the channel is about 50 Ωmm².

In a preferred embodiment according to the invention adjacent membranes in the stack are positioned in a substantially perpendicular manner forming compartments and/or channels.

For example, in a RED-process a membrane stack is manufactured by placing membranes on top of each other. On every cation exchange membrane an anion exchange membrane is located on which a second cation exchange membrane is put. Preferably, the direction of channels of the different membranes is perpendicular to the channels of the adjacent membranes. Providing holes for supplying the electrolyte solutions to the channels can be omitted as supply and discharge means are provided on the side of stack.

Furthermore, in a preferred embodiment according to the present invention, the channels are provided in a top layer provided on a base layer of the membrane.

The membrane comprises a top layer on a base layer, of which at least the base layer has suitable membrane properties. The top layer can be made of non-conductive material, like polyethylene or polypropylene, non-selective ion conductive material, like porous (breathable) polyethylene, or a layer comprising a thermoplastic material, such as polyethylene, and ion exchange material or resin particles, for example. The relatively straight forward design of the membrane stack is more robust, less sensitive to fouling and easier to clean (CIP) as compared to conventional membrane stacks.

The membrane stack according to the invention has as an additional advantage that the membranes can be produced according to a so-called (embossing) roll-to-roll principle in a single manufacturing line in an efficient and cost effective manner.

Preferably, the membrane is produced by performing an extrusion process, optionally performing the mentioned embossing process in order to produce the channels in the same manufacturing line.

Alternatively, the top layer is provided by placing a coating of a polymer solution, elastomers such as silicones, and/or a thermoplastic material, such as polyethylene or polypropylene, on the base layer. The coating can be placed on the base layer using extrusion, rotary screen printing, screen printing, gravure printing, slot-die coating etc. It will be understood that the method used depends amongst other things on the coating material. The desired profile for the flow channels can be achieved using die-cutting or kiss-cutting, for example. By so-called (rotary) kiss-cutting, only this top layer is cut or pinched to create the desired channels of the appropriate dimensions. The membrane stack according to the present invention enables the use of membranes that are effectively and efficiently manufactured.

In a preferred embodiment according to the present invention the membrane stack comprises a length and a width with the length larger than the width.

By providing the width direction with the supply and discharge means for the high osmotic solution, salt water for example, with smaller dimensions as compared to the length for the other fluid or electrolyte solution, the (lateral) electrical resistance of the fluid in the channels is increased and the resistance of the supply and exiting supply and discharge means parts is reduced. This reduces the effect of so-called (ionic) short-cut currents. Short-cut currents or ionic short-cut currents are caused by ions moving between compartments without passing the membrane. For example, this may take place in the supply and discharge means in case ions transfer between compartments.

In a further preferred embodiment according to the present invention the distance between the fluid supply and discharge means at the side of membrane stack is in the range of 0.1-50 mm, preferably 0.1-5 mm.

Providing a minimal distance between the supply and discharge means and the stack of membranes reduces leakage or short-cut currents from the fluid that is supplied to the (electrolyte) compartment. The actual distance between the supply and discharge means and the stack of membranes depends on the conduction of the solution and the amount of flow. Preferably, this distance is determined or achieved through sealing means. These sealing means prevent the solution to leave the membrane stack. Alternatively, the distance is determined by the depth of a distribution room in the supply and discharge means.

In a further preferred embodiment according to the present invention an additional edge is provided on a fluid entry and/or exit side of the membrane.

An advantage of this additional edge is the resistance against (ionic) short-cut currents. A further advantage of this edge is its assistance in manufacturing a profiled membrane according to the invention when removing material from the channels provided in the top or laminate layer using (rotary) die (kiss) cutting or a cutting plotter, for example, resulting in the desired membrane profile.

Preferably, the fluid supply and discharge means are provided with one or more protection barriers. The protection barrier may comprise flow barriers, for example seals. This protection or ionic current barrier further reduces the effects of (ionic) short-cut currents.

In a further preferred embodiment according to the present invention, the porous substrate comprises a (nano-micro) porous foil or sheet, for example, with the foil or sheet being able to transport ions.

Providing a nano-microporous foil or sheet results in relatively cheap and easy available porous substrate for the membrane stack. Conventional anion exchange membranes are made of relatively expensive material. Preferably, this (nano-micro) porous foil comprises a non-woven material, for instance a non-woven made from a polyolefin. Because anions like Cl⁻ show a higher mobility as compared to cations like Na⁺ a so-called liquid junction potential, also called diffusion potential, is established at the interface between the two solutions at the (nano-micro) porous foil substrate/membrane.

The invention further relates to a device and a method using the device for performing a membrane based process. The device according to the invention comprising:
 at least one anode compartment provided with an anode;
 at least one, separated from the at least one anode compartment, cathode compartment provided with a cathode; and
 a membrane stack as described above.

This device and method each provide the same effects and advantages as those stated with reference to the membrane stack.

The invention further also relates to a method for providing a homogeneous or heterogeneous membrane for use in the stack as described above, wherein a top layer with channels is provided on a base layer of the membrane, involving the steps of:
 providing a base layer with a top layer; and
 punching or die (kiss) cutting the top layer such that channels are provided for enabling a fluid flow.

Providing a membrane according to the present invention is possible using a number of alternative processes involving the above steps. These processes include (i) cast film extrusion and optionally involving inline embossing, (ii) cast film extrusion involving an extrusion such that the desired profile for the membrane is directly produced, and (iii) extrusion coating wherein a thermoplastic coating is provided on a substrate or base layer after which step the profile with channels is provided using an embossing step, for example. These processes and optional (sub)steps thereof will be discussed in more detail below and in relation to the illustrated embodiments.

A top layer can be provided by coating the base layer with a polymer solution, elastomers such as silicones or an extrusion coating comprising a thermoplastic material, such as polyethylene or polypropylene, for example. A top layer can also be provided by laminating the base layer with a laminate layer. Channels are preferably provided in this coating or laminate layer by punching, kiss-cutting, or the use of a profiling knife, for example. This enables manufacturing of a (heterogeneous) membrane in a roll-to-roll process, for example. An advantage of this process is the possibility to manufacture the membranes in one manufacturing line, for example including an embossing roller. The design for the membrane stack as described above enables a method for producing membranes provided with a profile, e.g. channels, involving processing the top layer using (rotary) kiss-cutting and/or the other processes, the principles of which are known to the skilled person, for example. This enables a relatively easy and relatively cheap manufacturing of the membrane. This contributes to the overall efficiency and effectiveness of the membrane process.

The (heterogeneous) membrane manufactured using an extrusion process as indicated above may comprise a (porous) substrate, woven or non-woven. In an extrusion process both the base and top layers can be produced in the same manufacturing line. The top layer can be of the same material as the base layer. Alternatively, the top layer can be made from other (thermoplastic) materials, such as polyethylene or polypropylene, optionally including a filler material, like $TiO_2$ or $CaCO_3$.

Figure 2A:
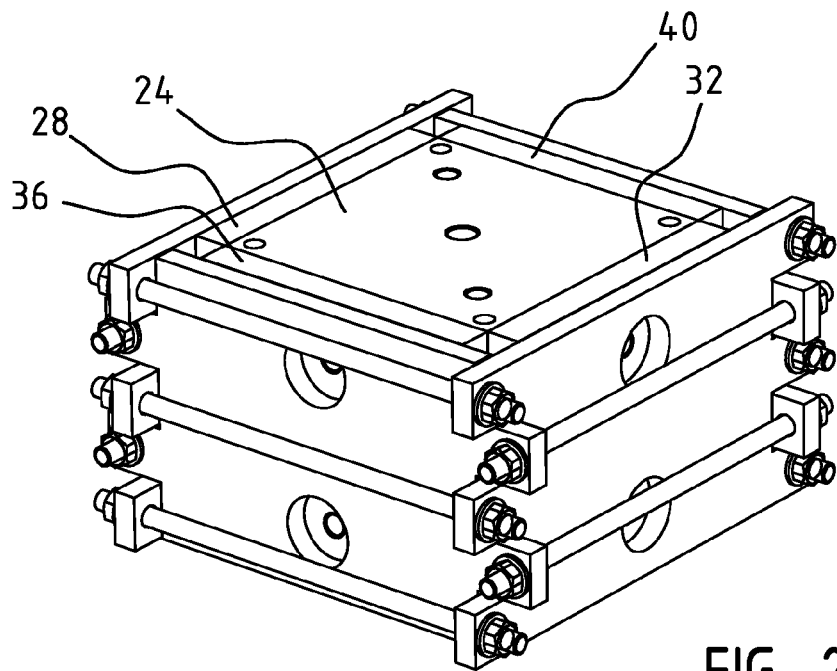
Figure 2B:
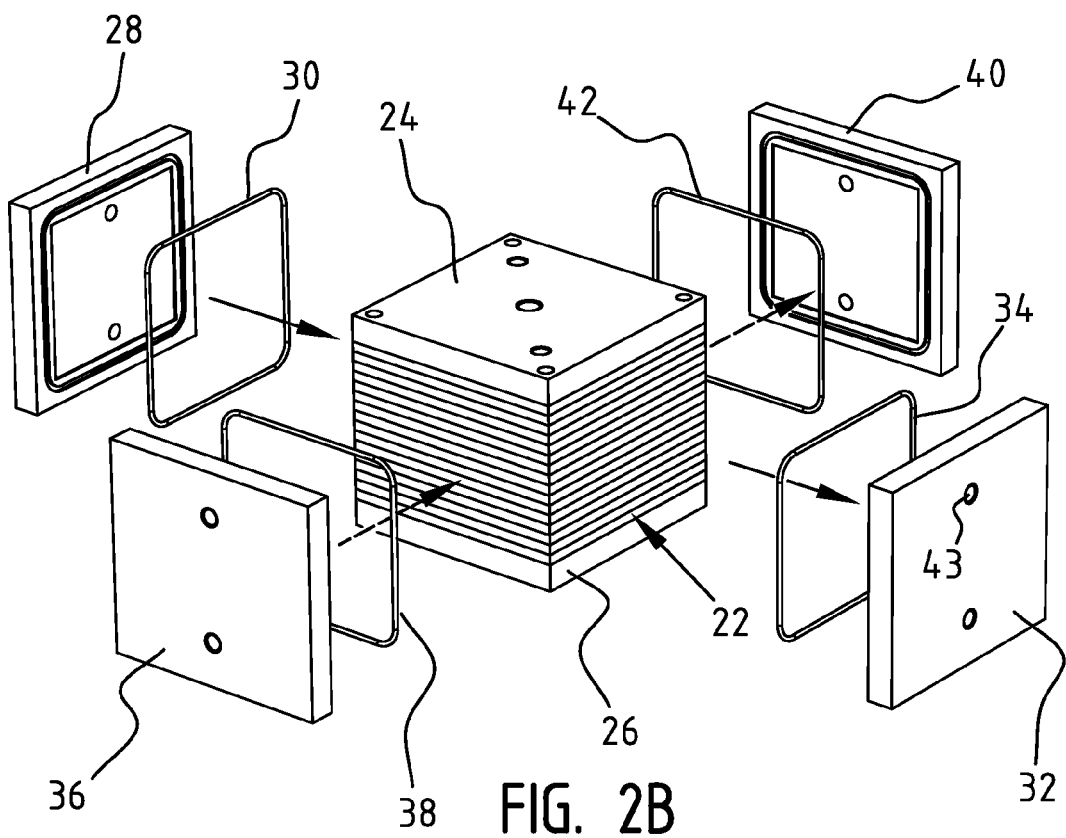
Figure 4A:
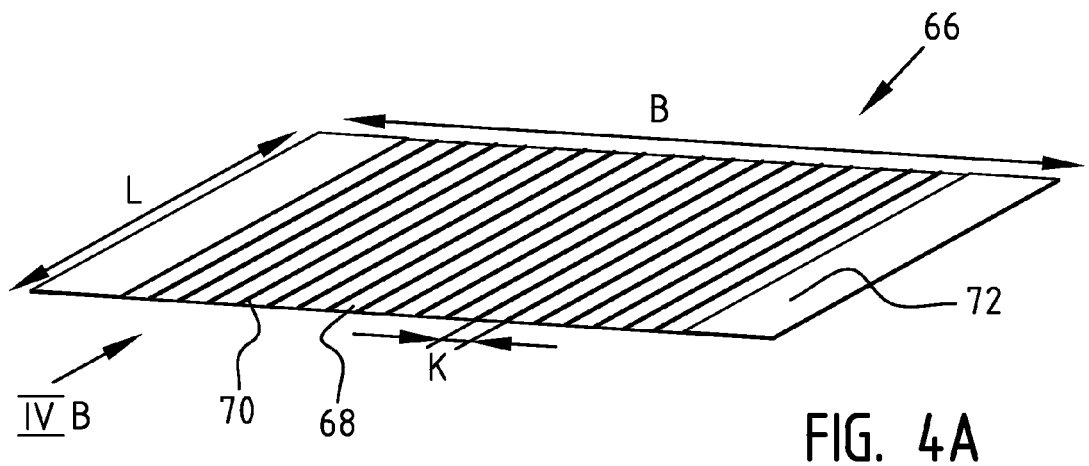
Figure 5:
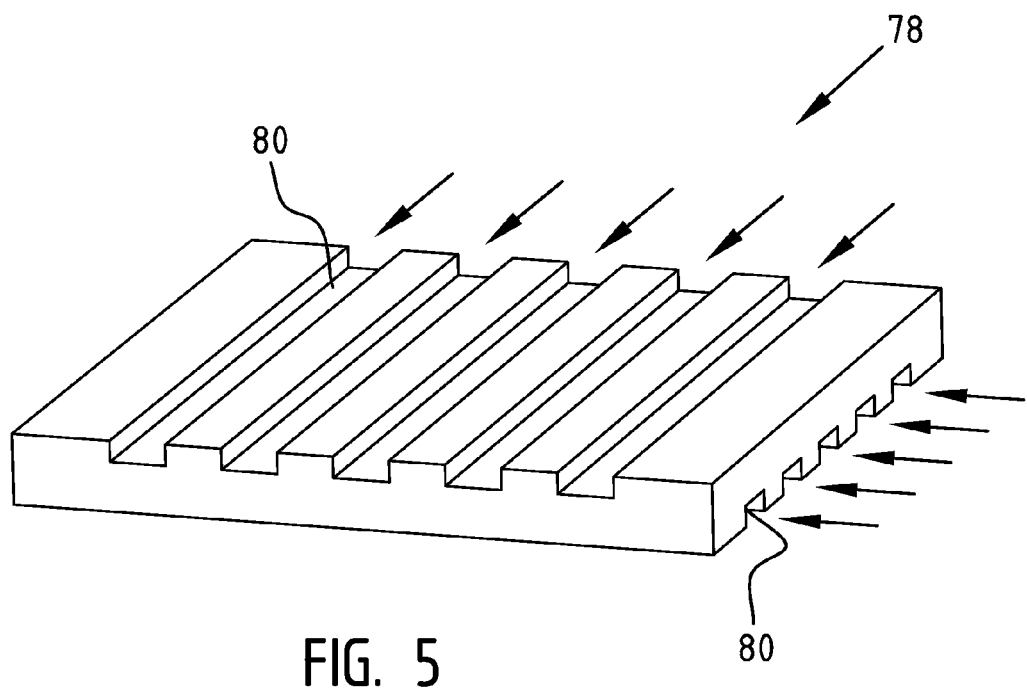

Further advantages, features and details of the invention are elucidated on basis of the preferred embodiments thereof, wherein reference is made to the accompanying drawings, in which:
 FIG. 1 shows a schematic outline of a RED process;
 FIGS. 2A and B shows a perspective view of the membrane stack according to the invention;
 FIG. 3A-C shows different embodiments of the supply and discharge means of FIG. 2;
 FIGS. 4A and B shows views of a membrane in the stack of FIG. 2; and
 FIG. 5 an embodiment of a membrane for use in a (bio) fuel cell, for example.

In a membrane based process, like a reverse electrodialysis process 2 (FIG. 1), a number of anion exchange membranes 8 and cation exchange membranes 10 are placed between anode 4 and cathode 6. (Electrolyte) compartments are formed between anion exchange membranes 8 and cation exchange membranes 10, wherein in the illustrated embodiment a flow of seawater 12 and river water 14 flow alternately through adjacent compartments. Owing to the differences in concentration of ions in the flow of seawater 12 and river water 14, the ions in seawater 12 tend to move to the river water 14 in order to equalize the concentrations. For the sake of convenience only sodium and chloride ions are shown as positive and negative ions in FIG. 1.

Since anion exchange membranes 8 mainly allow passage of anions and cation exchange membranes 10 mainly allow passage of cations, the transport of anions and cations will take place in opposite directions. The anions ($Cl^-$) move in the direction of anode 4 and the cations ($Na^+$) move in the direction of cathode 6. In order to maintain electric neutrality an oxidation reaction takes place in the compartment in which anode 4 is placed and a reduction reaction takes place in the compartment in which cathode 6 is placed. An electron flow is hereby generated in electric circuit 16 to which anode 4 and cathode 6 are connected. In this electric circuit 16 electric work can be performed by an electrical apparatus 18, designated symbolically here by means of a light-bulb.

Shown with hatching in FIG. 1 is a dialytic cell 20 which consists of a membrane pair of an anion exchange membrane 8 and cation exchange membrane 10 and a mass of a solution with a high ion concentration, for instance seawater, and a solution with a low ion concentration, for instance river water. The number (N) of dialytic cells 20 can be increased in order to increase the potential difference between anode 4 and cathode 6, thereby forming a membrane stack.

The stack of membranes 22 (FIGS. 2A and B) comprises a top layer or a top plate 24 including an electrode compartment and a bottom layer 26 also including an electrode compartment. Stack 22 is placed between the two layers 24, 26. From a first side of stack 22 solutions are provided through supply plate 28 that in use is connected to the stack 22 through seal 30. On a second side of stack 22 a second plate 32 is provided with seal 34. A first solution is supplied to stack 22 by plate 28 and exits stack 22 through (discharge) plate 32 (indicated with an arrow). On a third side of stack 22 there is provided a supply plate 36 with seal 38. On a fourth side of stack 22 a fourth plate 40 with seal 42 is provided. Stack 22 and supply and discharge means 28, 32, 36, 40 define the membrane stack according to the invention. In the illustrated embodiment plates 28, 32, 36, 40 comprise two openings 43 for the electrolyte solutions. The number of openings 43 depends, amongst other things, on the dimensions of the stack. In the illustrated embodiment plates 28, 32, 36, 40 are oriented substantially perpendicular to membranes 8, 10.

In the illustrated embodiment a second solution is supplied by plate 36 to stack 22 and exits stack 22 through (discharge) plate 40 (indicated with a dashed arrow).

A supply plate or supply layer 44 (FIG. 3A) has an entry 46 via which the solution enters plate 44. It will be understood that plate 44 may also be used for discharge of fluid and is provided with an exit 46. From entry 46 the solution enters the solution compartment 48 that is provided between the side of stack 22 and plate 44. The objective of the supply plate 44 is to force an electrolyte to flow through the appropriate membranes.

In the illustrated embodiment between plate 44 and stack 22 seal 50 is provided with a thickness of 0.1-50 mm. Seal 50 determines the width of distribution compartment 48. To improve the distribution of flow over the electrolyte compartments of stack 22 an alternative supply plate 52 (FIG. 3B) is provided. Plate 52 comprises an entry 54 and a distribution compartment 56. The width of the distribution chamber 56 is determined by plate 52. On the exit side of plate 52 there is provided a non-conductive, for example plastic, punched plate 58 with openings 60. Between plate 52 and the side of stack 22 is provided a seal 62. In addition to seal 62 there are provided a number of resistors 64 to prevent or reduce short-cut currents, which are caused by exchange of solution between the membranes, between plate 52 and the side of stack 22. In the illustrated embodiment supply plate 52 is provided with an entry 54 that has an opening directed towards the membrane stack. In an alternative embodiment 63 (FIG. 3C) also in accordance with the invention entry 54 is provided on the upper side of supply plate 52, for example. It will be understood that more than entry 54 can be provided in plate 52. The opening of entry 54 is in this embodiment directed parallel to the stack of membranes, or in other words perpendicular to the direction of the channels. To homogenize the pressure distribution inside plate 52 and stimulate a homogeneous flow distribution over the membranes it will be understood that openings 60 can be dimensioned accordingly. It is noted that also in this embodiment the fluid flow enters the membrane stack in the plane of the membrane of the membrane stack.

A membrane 66 (FIGS. 4A and B) comprises channels 68 that are separated with walls 70. On the sides of membrane 66 is provided an edge area 72 to prevent leakages and (ionic) short-cut currents. Because of area 72 isolated electrolyte compartments/channels are created when the membranes are stacked and a stack according to the present invention is achieved. Membrane 66 is provided with a width B and a length L. The width of edge area or unprofiled area 72 is denoted by X. The width X is relevant for reducing the (ionic) short-cut currents. These currents are reduced with increasing X. However, this reduces the effective membrane surface area.

In the illustrated embodiment membrane 66 comprises a base material or layer 74 of an ion exchange material with suitable membrane properties and a top or laminate layer 76 that is provided on top of base material 74. The total thickness of membrane 66 is D and the thickness of laminate layer is d. The width of channels 68 is K and the width of walls 70 is W. The thickness of the base layer is denoted with t. Below typical values for the illustrated embodiment of membrane 66 are presented in the table below.

| | |
|---|---|
| d | 10-2000 µm, preferably 50-200 µm |
| W | 50-2000 µm, preferably 100-200 µm |
| K | 0.1-50 mm, preferably 1-10 mm |
| X | 1-100 mm, preferably 10-50 mm |
| D | 1-3000 µm, preferably 100-300 µm |
| t | 1-2500 µm, preferably 10-300 µm |

In a membrane based process, like a RED process, a first solution is provided to membrane stack 22 via supply and discharge means 28. Supply and discharge means 28 provide this first solution to a first set of electrolyte compartments of the dialytic cells 20. The solution leaves stack 22 through plate 32. A second solution is provided by supply plate 36 to the second set of electrolyte compartments of dialytic cells 20 such that stack 22 is provided with alternating electrolyte compartments with a solution having a high ion concentration, for instance sea water, and compartments with a solution of a low ion concentration, for instance river water. In case of a RED process energy is generated through moving ions between the compartments separated by membranes 66.

Stack 22 is manufactured by placing membranes 66 on top of each other. On every cation exchange membrane an anion exchange membrane is located on which a second cation exchange membrane is put. Preferably, the direction of channels 68 of the different membranes 66 is perpendicular to the adjacent membranes 66. Providing holes for supplying the electrolyte solutions to the channels 68 can be omitted as supply and discharge means 28, 32, 36, 40 are provided on the side of stack 22.

Figure 4B:
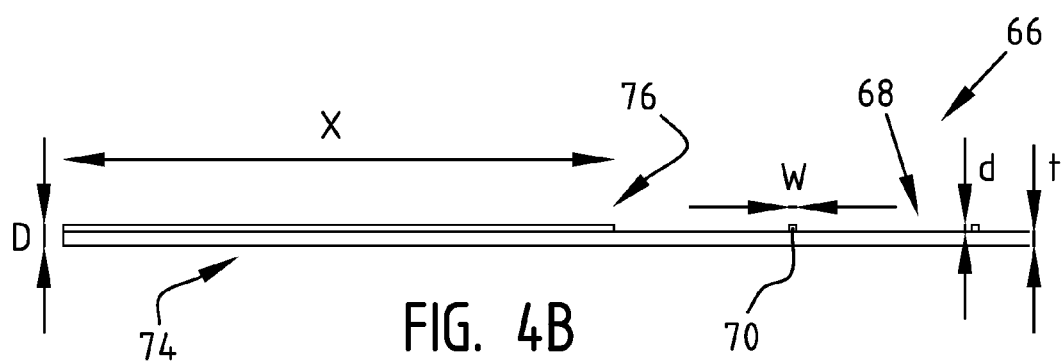

For manufacturing a membrane 66 (FIG. 4B) a top layer 76 is created by coating a base layer 74 with a polymer solution, elastomer such as silicones, thermoplastic materials, such as polyethylene and/or polypropylene, such that a top layer is provided on base layer 74. At desired locations the material of laminate layer 76 is removed to create channels.

Alternatively, base material or layer 74 is provided with top layer 76 in an extrusion process in a manner known to the skilled person. At desired locations the material of laminate layer 76 is removed to create channels.

Manufacturing a (heterogeneous) membrane according to the invention involving an extrusion process may involve cast film extrusion, preferably comprising an in-line embossing roller for providing the desired channels, or cast film extrusion with an extrusion process directly providing the desired profiled membrane, or extrusion coating wherein a membrane layer is provided on a woven or preferably a non-woven from a hot melt comprising ion exchange resin particles, and a thermoplastic material such as polyethylene. Depending on the apparatus that is used profiles can be provided on both sides of the membrane material and/or on more than one layer, comprising the same or different materials, at the same time.

Although the membrane can be manufactured from one (heterogeneous) material, alternatively, a base layer 74 is provided on a (porous) substrate, such as a woven or non-woven. Next, the top layer is provided on the base layer with the top layer comprising a thermoplastic material, such as polyethylene, and ion exchange material and/or resin particles, or a (nano-micro) porous polyethylene ("breathable") film, or a non-conductive layer of a thermoplastic material such as polyethylene, etc.

Alternatively, using the above processing methods the desired profile can be applied to existing homogeneous or heterogeneous membranes.

In a production method involving a coating step the base material 74 is preferably provided on a roll and in a next step provided with a coating by an extrusion coater with a coating thickness of preferably 10-2000 μm. The adhesion of laminate material to the base material is such that material for the channels 68 can be removed, for example using kiss-cutting. Optionally, an additional edge of base material 74 of 0.5-5 mm where laminate layer 76 is locally removed such that the removed laminate material for realising channels 68 can be removed from the base material 74 relatively easily, for example using kiss-cutting. As an additional advantage this additional edge reduces the short-cut currents between supply and discharge means and stack 22. Optionally, after removing the material for achieving channels 68 the adhesion of laminate layer 76 to base material 74 can be improved by heating using a hot fusing roller or ultrasonic welding, for example. The top (coating) layer can be provided from the same material as the base layer. Alternatively, a top layer of a different material or composition is provided. Possible materials or compositions for the top layer include elastomers, functional (ion conductive) polymer, a ion conduction layer comprising a thermoplastic material, such as polyethylene and ion exchange material and/or resin particles.

The composition of the base layer and/or top layer comprises ion exchange material and/or resin particles and a thermoplastic binder, such as polyethylene. Optionally, a filler material of $SiO_2$, $TiO_2$, $CaCO_3$, or the like and other additives can be added and the mixture can be extruded in a foil, so-called cast film extrusion, or coated on a porous base material, such as a non-woven, so-called extrusion coating. An advantage of using filler material is the cost reduction as ion exchange material and/or resin is relatively expensive. In addition, $TiO_2$ might help to reduce (bio)-fouling, for example.

Also, it is possible to provide a woven or preferably a non-woven made of for instance a polyolefin, such as polyethylene, like LDPE, or polypropylene, a mixture thereof, or polyester, on the base material 74, for example by laminating, and punching or kiss-cutting the desired profile of channels 68 as described above.

As an alternative to the non conductive thermoplastic material, such as polyethylene and/or polypropylene, laminate top layer it is possible to use a (nano-micro) porous layer like a so-called breathable (polyethylene) film, the film comprising $CaCO_3$ to provide a foil or layer with some porosity. As an alternative to $CaCO_3$ it is possible to use $TiO_2$ (1-70% wt), which is more stable and might also help to reduce (bio)-fouling. Alternatively, an ion conductive layer is provided by mixing a thermoplastic material, such as polyethylene and/or polypropylene, material with cation and/or anion exchange material and/or resin particles resulting in an ion conductive layer.

Alternative to the (rotary) kiss-cutting of laminate layer 76 to provide channels after having coated this layer on the base material 74 it is possible to laminate or deposit the desired profile with channels 68 directly on the base material 74. In other words, when using a perforated "extrusion die" the layer is directly coated upon the base layer or material 74 such that the desired channels are directly provided in the laminating/depositing step. This direct production of a so-called profiled membrane may involve cast film extrusion process including an embossing step providing the profile in the membrane, or so-called hot melt slot-die extrusion wherein the extrusion nozzle/die shape corresponds with the desired membrane profile. Alternative processing steps to provide a base layer with the profiled top layer involves (rotary) screen printing, gravure printing, engraved roller coating, slot die coating, for example. Alternatively, it is possible to provide an appropriate polymer solution, including solutions mentioned above, on a woven/non-woven substrate directly providing the desired profile. This may involve processing steps like cast knife, slot die, rotary screen printing, gravure printing, engraved roller. Next, the coating is cured in a way depending on the polymer that is used.

Furthermore, manufacturing a membrane can be achieved using a cast film extrusion or extrusion coating process together with providing a profile in an embossing step using an embossing roller in one manufacturing line, for example. Further optional or alternative processing steps are similar as described above.

It will be understood that the above steps can be combined and/or (sub)-steps can be interchanged.

An alternative membrane 78 (FIG. 5) is provided with channels 80 on both sides of the membrane. Flow directions through channels 80 are indicated with arrows. Membrane 78 is relevant for (bio) fuel cells, for example, but can also be used for ED and RED. In (bio) fuel cells the flows can be liquids or gases or a combination thereof. However, membrane 78 is most relevant for applications with one type of membrane, like (bio) fuel cells, as mentioned above. Some or all of the features mentioned above in relation to other embodiments according to the present invention can be provided in relation to alternative membrane 78. An advantage of membrane 78 as illustrated is the inherent cross-flow configuration of the stack of membranes.

The present invention is by no means limited to the above described preferred embodiments thereof. The rights sought are defined by the following claims within the scope of which many modifications can be envisaged. The membrane stack according to the invention can also be applied to membrane processes in the galvanic industry, for example in the regeneration of acids. The methods according to the invention for producing a membrane can also be performed starting with an existing membrane and providing this membrane with the desired profile.

The invention claimed is:

1. A membrane stack for a membrane based process comprising:
    a number of membranes forming compartments; and
    a fluid supply and a fluid discharge for supplying and discharging a fluid to the compartments such that the fluid is supplied and discharged substantially in the plane of the membrane of the membrane stack and from the side of the membrane stack in the plane of the membranes, and wherein the membranes comprise an unprofiled area.

2. The membrane stack according to claim 1, wherein the fluid supply and fluid discharge are provided on opposite sides of the membrane stack.

3. The membrane stack according to claim 1, wherein a second fluid supply and a second discharge are provided different sides of the membrane stack to provide a second fluid to compartments from a different side of the membrane stack.

4. The membrane stack according to claim 1, wherein the fluid supply and the fluid discharge means comprise a distribution chamber for distributing the fluid over the membranes.

5. The membrane stack according to claim 1, wherein at least some of the membranes comprise channels enabling a fluid flow.

6. The membrane stack according to claim 5, wherein the channels in or on the membrane are provided with a width in the range of 0.1-50 mm.

7. The membrane stack according to claim 5, wherein the channels in or on the membrane provided with a depth in the range of 10-2000 μm.

8. The membrane stack according to claim 5, wherein the channels in or on the membrane are provided in a laminate or top layer provided on a base layer of the membrane.

9. The membrane stack according to claim 1, wherein the unprofiled area is in the range of 1-100 mm.

10. The membrane stack according claim 1, wherein adjacent membranes are positioned in a substantially perpendicular manner forming compartments and/or channels.

11. The membrane stack according claim 1, wherein the membrane stack comprising a length and a width, with the length larger than the width.

12. The membrane stack according claim 1, wherein a distance between the fluid supply and the fluid discharge and a side of the membrane stack is in the range of 0.1-50 mm.

13. The membrane stack according to claim 12, wherein the distance is determined by sealing means.

14. The membrane stack according claim 1, wherein an additional edge is provided on a fluid entry and/or exit side of the membrane.

15. The membrane stack according to claim 14, wherein the fluid supply and the fluid discharge are provided with one or more protection barriers for minimizing ionic short cut currents.

16. The membrane stack according claim 1, wherein the membrane stack further comprises a porous substrate.

17. A device for performing a membrane based process, the device comprising:
- at least one anode compartment provided with an anode;
- at least one, separated from the at least one anode compartment, cathode compartment provided with a cathode; and
- a membrane stack according to claim 1.

* * * * *